UNITED STATES PATENT OFFICE 2,485,637

CITRIC ACID ESTERS IN CHEESE

Chester M. Gooding, Staten Island, N. Y., and Ralph H. Neal, North Bergen, and Hans W. Vahlteich, Edgewater, N. J., assignors to The Best Foods, Inc., New York, N. Y., a corporation of New Jersey No Drawing. Application December 13, 1947, Serial No. 791,656

20 Claims. (Cl. 99—116)

This invention relates to cheese products and more particularly to improved cheese products which possess marked fresh flavor retention characteristics.

An object of this invention is to prevent the flavor deterioration or staling of cheese products when stored for a period of time.

Another object of this invention is to retard the deterioration of cheese products.

Another object of this invention is to prevent the exudation of moisture from cheese products containing a relatively large percent of water.

Certain types of cheese are particularly prone to deteriorate or stale after manufacture. In fact, cream cheese, when permitted to stand at room temperature (70° F.) for a period of a few days, develops a stale taste and a decided off-flavor which renders it non-usable. Again, certain types of cheese, such as cream cheese, exude moisture and manifest so-called weeping, which is undesirable from a marketing standpoint.

In accordance with this invention, cheese products are produced which may be stored for relatively prolonged periods without developing off-flavor, and which do not manifest exudation of moisture or weeping. The cheese products of this invention in addition to the usual components, such as butter fat, water, water soluble non-fat milk solids and edible milk protein, contain a monoalkyl, monoalkylene, dialkyl or dialkylene ester of citric acid. The concentration of the mono- or di-ester of citric acid in the improved cheese product may vary over wide limits, but a concentration of .002 to .1% by weight, and preferably .02 to .05% by weight, of the monoesters of citric acid in the cheese product is satisfactory, while a concentration of .01 to 1% by weight, and preferably .01 to .1% by weight of the diester has been found satisfactory. The cheese product may contain a single monoalkyl or monoalkylene ester of citric acid or a single dialkyl or dialkylene ester of citric acid, or it may contain a plurality of monoalkyl or monoalkylene esters of citric acid or a plurality of dialkyl or dialkylene esters of citric acid. In fact, it has been found advantageous to incorporate in the cheese product both a monoalkyl and dialkyl ester of citric acid or a monoalkylene and dialkylene ester of citric acid.

The monoalkyl or monoalkylene ester of citric acid, even in relatively low concentration, is particularly effective for prolonging the usable life of cheese products. While the dialkyl and dialkylene esters are also of value for this purpose, a larger concentration must be employed. However, certain dialkyl and dialkylene esters of citric acid are especially effective in preventing the so-called weeping or exudation of moisture from cheese products, such as certain cream cheeses, which have a propensity to manifest this phenomena. For this purpose, dialkyl esters of citric acid having at least 12 carbon atoms in the alkyl group and dialkylene esters of citric acid having at least 16 carbon atoms in the alkylene group are especially effective.

In some cases, it has been found advantageous to incorporate the monoalkyl or monoalkylene esters of citric acid into the cheese with the aid of a solubilizing or oil-coupling agent. Examples of satisfactory solubilizing agents for this purpose are the di- and tri-alkyl or the di- and tri-alkylene esters of citric acid, in which the alkyl or alkylene group has at least 8 carbon atoms, unsubstituted aliphatic alcohols having at least 6 carbon atoms, monocarboxylic acids having at least 10 carbon atoms and monoglycerides of fatty acids, the fatty acids having at least 10 carbon atoms. When a solubilizing agent is employed, the monoester of citric acid is first dissolved in the solubilizing agent, and the resulting mixture is incorporated in the cheese product. Di- and trialkyl and -alkylene esters of citric acid in which the alkyl or alkylene group has at least 8 carbon atoms have been found very satisfactory for solubilizing the monoalkyl or monoalkylene ester of citric acid.

The esters of citric acid may be incorporated in the cheese product in any convenient manner which insures the substantial uniform dispersion of the ester throughout the product. For example, the ester or esters may be mixed with the cheese product with or without the aid of a solubilizing agent by suitable mechanical mixers. Alternately, the esters may be thoroughly mixed with the whole or a portion of the butter fat component of the cheese product, which has been previously separated, and the butter fat containing the esters may be mixed with the other components of the cheese product. Again, the esters may be dispersed throughout the milk just prior to the production of cheese from it. While, as described for example in "The Book of Cheese" by Thom and Fisk, published by the MacMillan Company, New York 1921, the methods of producing cheese vary markedly with the particular type of cheese desired, the esters of citric acid may be incorporated during any convenient step in the method which insures the substantial uniform dispersion of the esters throughout the body of the finished cheese.

All types of cheese are improved by incorporating the mono- or di-ester of citric acid in accordance with this invention although the greatest improvement is manifested in cheese of relatively short life, such as cream cheese. However, this invention may be utilized to produce cheese of other types, such as cheese with sour milk flavor which are eaten fresh, such as the Neufchâtel group; soft cheeses which have been ripened, such as Camembert, Liederkranz and Limburger; semi-hard cheeses, such as Roquefort, Gorgonzola and Stilton; and hard cheeses, such as the Edam, Cheddar and Gruyère. The cheese products in accordance with this invention may vary in composition over wide limits; the butter fat content, for example, may vary from a little more than a trace to 60%, while the water content may be, for example, from 30 to 75%.

The extension of the usable life of cheese products of this invention over similar cheese products without the mono- or di-esters of citric acid is demonstrated by the results of the comparative testing of cream cheese with and without the addition of a mixture of mono- and di-isopropyl citrate. In this testing, a mixture of mono-isopropyl citrate and diisopropyl citrate at three different quantitative levels was incorporated in cream cheese, and one set of the resulting cheese products was stored for several days at 45° F., another set was stored at room temperature and a third set was stored for approximately three quarters of the time at 45° F. and approximately one quarter of the time at room temperature. With each set there was stored under the identical conditions an identical sample or control of cream cheese without an additive. Each of the samples was evaluated for odor and flavor periodically by four experts skilled in the determination of flavor and odor characteristics. The results of these testings are as follows:

Table 1

| Sample | Addition | Age, Days | Fresh | 45° F. | 45° F. at night and room temperature during day | 70° F. |
|---|---|---|---|---|---|---|
| Control | None | 0 | Good—Creamy taste. | | | |
| No. 2 | 0.009% of a mixture consisting of principally monoisopropyl citrate and diisopropyl citrate. | 0 | Good—not different from control. | | | |
| No. 3 | .018% of a mixture consisting of principally monoisopropyl citrate and diisopropyl citrate. | 0 | do | | | |
| No. 4 | .036% of a mixture consisting of principally monoisopropyl citrate and diisopropyl citrate. | 0 | do | | | |
| Control | See above | 1 | | Good—Creamy | Fairly good—slightly sour. | Off-flavor—slightly moldy. |
| No. 2 | do | 1 | | do | do | Slightly off-flavor—slightly moldy. |
| No. 3 | do | 1 | | do | do | Fairly good. |
| No. 4 | do | 1 | | do | Good-creamy | Do. |
| Control | do | 2 | | Fairly good—sligthly sour. | Strong odor—probably not usable. | Off odor and flavor—not usable. |
| No. 2 | do | 2 | | Slight sour odor—slight old taste. | Slightly stale—barely usable. | Somewhat moldy—not usable. |
| No. 3 | do | 2 | | Clean odor and flavor—good. | Slightly strong odor—fairly good. | Stale tasting—not usable. |
| No. 4 | do | 2 | | do | No unusual odor—good. | Best of this group—sharp tasting—barely usable. |
| Control | do | 3 | | Slightly stale—barely usable. | Not usable | Moldy—not usable. |
| No. 2 | do | 3 | | Slightly stale—but usable. | Stale—barely usable | Not usable. |
| No. 3 | do | 3 | | Good | Fairly good—usable | Do. |
| No. 4 | do | 3 | | do | do | Do. |
| Control | None | 5 | | Stale—not usable | Stale—not usable | Limburger odor—not usable. |
| No. 2 | .009% of a mixture consisting of principaly monoisopropyl citrate and diisopropyl citrate. | 5 | | Slightly stale but probably usable. | Stale—probably not usable. | Not usable. |
| No. 3 | .018% of a mixture consisting of principally monoisopropyl citrate and diisopropyl citrate. | 5 | | Fairly good—slightly sour. | Slightly stale—probably usable. | Do. |
| No. 4 | .036% of a mixture consisting of principally monoisopropyl citrate and diisopropyl citrate. | 5 | | Good—still sweet | Fairly good—slightly sour. | Stale—not usable. |
| Control | See above | 7 | | Not usable | Not usable | |
| No. 2 | do | 7 | | Slightly stale—similar to 1 lb. store sample. | do | |
| No. 3 | do | 7 | | Fairly good—probably usable. | Fair—barely usable | |
| No. 4 | do | 7 | | Clean—usable | Slightly stale—similar to 1 lb. store sample. | |
| Control | do | 9 | | Not usable | Not usable | |
| No. 2 | do | 9 | | Not usable stale | do | |
| No. 3 | do | 9 | | Barely usable—slightly stale. | Stale—not usable | |
| No. 4 | do | 9 | | Usable—better than 1 lb. store sample. | Stale—barely usable | |
| Control | do | 12 | | Not usable | Not usable | |
| No. 2 | do | 12 | | do | do | |
| No. 3 | do | 12 | | Stale odor and flavor—not usable. | do | |
| No. 4 | do | 12 | | Somewhat stale—barely usable. | do | |

The mixture of citric acid esters which was incorporated in the cream cheese contained about 75% monoisopropyl citrate, about 20% diisopropyl citrate and the remainder triisopropyl citrate. Prior to incorporating the mixture of isopropyl citrates in the cheese, the mixture was dissolved in monoglycerides of higher fatty acids in the proportion of about 3 parts of the mixed isopropyl esters to about 5 parts of the monoglycerides. A review of the above table demonstrates that the usable life of cream cheese is increased materially by having incorporated therein the mono- and di-esters of citric acid. The results shown in the above table are summarized in terms of usable life in the following table:

Table II

|  | Control, No additions | .009% of a mixture consisting of principally monoisopropyl citrate and diisopropyl citrate | .018% of a mixture consisting of principally monoisopropyl citrate and diisopropyl citrate | .036% of a mixture consisting of principally monoisopropyl citrate and diisopropyl citrate |
| --- | --- | --- | --- | --- |
| 45° F. Storage | 3–5 days | 5–7 days | 7–9 days | About 12 days. |
| Storage at 45° F. approximately ¾ of time and at room temperature ¼ of time. | 2–3 days | 3–5 days | 7–9 days | 9–12 days. |
| Room temperature storage | About 1 day | 1–2 days | 1–2 days | 2–3 days. |

The benefits obtainable by the addition of the esters to the cream cheese are most pronounced under conditions of normal storage (i. e. refrigeration most of the time) rather than at room temperature. While the esters somewhat retard the development of sour (fermentation type) flavors, the chief benefit obtained is a substantial retardation of the development of the strong unpleasant stale character which normally develops in cream cheese within a few days.

Since both the dialkyl or dialkylene citrates and the monoalkyl or monoalkylene citrates are desirably incorporated in the cheese products, it is advantageous to prepare a mixture of the mono- and di-esters of citric acid simultaneously. The mixture of mono- and di-esters of citric acid may be prepared by the esterification of citric acid and an alcohol, such as a monohydric primary or secondary alcohol, preferably by reacting the citric acid and the alcohol in proportions which favor the formation of the di- and mono-esters in the ratio desired in the mixture. The esterification may be conducted by any of the well known methods employed for the production of esters, and the resulting reaction mixture which may comprise not only the mono- and di-esters of citric acid, but a quantity of the triesters of citric acid, is subjected to treatment by fractional crystallization or selective extraction with a suitable solvent, if desired, which removes the major portion of the triesters of citric acid present. The mono- and di-esters may also be separated from each other by fractional crystallization or selective extraction. If desired, the mixture comprising principally the di-ester with a lesser amount of the mono- and some of the tri-ester, may be used in the cheese product. To produce the mixture, a monohydric primary or secondary alkyl or alkylene alcohol, for example, may be reacted with citric acid monohydrate, by heating to an elevated temperature, such as 150° C., under suitable pressure until the reaction is complete. The reaction product without further purification may be incorporated in the cheese product.

Examples of the mono- and di-citric acid esters which may be incorporated in the cheese product are the citric acid esters of the following alcohols: ethanol, propanols, pentanols, 2-ethyl-hexanol, octanols, decanols, dodecanols, hexadecanols, octadecanols, cosanols, docosanols, 2-ethyl-hexenols, octenols, decenols, dodecenols, hexadecenols, octadecenols, cosenols and docosenols.

Examples of the monocarboxylic acid monoesters of glycerol or propylene glycol or their esters which may be employed as solubilizing polymers or oil coupling agents are the monostearyl glycerides, monooleyl glycerides, monolauryl glycerides and monopalmityl glycerides, or their corresponding polyglycerol esters or mixtures thereof. These monocarboxylic acid monoesters, as commercially prepared, contain substantial amounts of the corresponding monocarboxylic acid diesters and small amounts of the corresponding monocarboxylic acid triesters. Such monocarboxylic acid monesters as commercially prepared may be employed as the solubilizing agents in the compositions of this invention. Monoglycerides prepared from an edible oil, such as cotton seed oil, have been found to be very satisfactory solubilizing agents.

Examples of saturated monohydric alcohols which may be employed as solubilizing agents are 2-ethylhexyl alcohol, n-octyl alcohol, stearyl alcohol, cetyl alcohol and myristyl alcohol.

Examples of the fatty acids which may be employed as solubilizing agents are stearic acid, palmitic acid, oleic acid, lauric acid and myristic acid.

A more comprehensive understanding of this invention is obtained by reference to the following typical examples of the invention:

*Example 1.—Cream cheese containing monoisopropyl citrate and diisopropyl citrate*

To a quantity of fresh cream cheese is added a solution of a mixture of monoisopropyl citrate and diisopropyl citrate in monoglycerides of fatty acids containing principally monoglycerides of eighteen carbon atom fatty acids. This solution is worked into the fresh cream cheese by suitable mechanical mixers to effect the substantially uniform dispersion of the esters throughout the body of the cream cheese. Sufficient solution containing the mixed mono- and di-isopropyl esters is incorporated in the cream cheese so that the resulting cream cheese contains about .04% by weight of the mixed mono- and di-isopropyl esters. The concentration of the citric acid esters in the monoglycerides is about 37% by weight, and the composition of the mixture of esters is about 90% monoisopropyl citrate, about 10% diisopropyl citrate and a small quantity of triisopropyl citrate.

The mixture of monoisopropyl citrate and diisopropyl citrate is prepared as follows:

Equal parts of USP XII or anhydrous citric acid and anhydrous isopropyl alcohol are heated together under reflux, without catalyst for 118 hours at 92° C., after which time the acid value of the reaction mixture is found to be about 203.6 and saponification value 393 (one-half esterified). The alcohol and most of the water of reaction are removed by low temperature evaporation in vacuo.

The residue is taken up with ethyl ether and then thrown out of the ether solution by the addition of a quantity of low-boiling petroleum ether just sufficient to form a precipitate. The precipitate or oily residue is again taken up with ethyl ether and the precipitation with low boiling petroleum ether repeated. This procedure is repeated several times. After final removal of solvent by heating with stirring to 130° C. a typical anaylsis is:

|  | Found | Calc'd |
|---|---|---|
| Acid Value | 454 | 480 |
| Saponification Value | 709 | 720 |

This product solidifies after long standing and consists of a mixture of about 90% monoester and about 10% diester. The resulting product, without further purification, may be used in the cream cheese as heretofore described.

Example 2.—Cream cheese containing monostearyl citrate

Monostearyl citrate is incorporated in cream cheese by adding a quantity of monostearyl citrate during the processing of the cream cheese. It is added in the form of a water paste at the time of draining and before working in the conventional process for the production of cream cheese. It can be conveniently prepared by mixing 1 part by weight of the monoester to two parts by weight of water. The quantity of monostearyl citrate added in the form of a water paste is sufficient to result in a cream cheese containing .2% of monostearyl citrate by weight of the finished cream cheese.

The monostearyl citrate is prepared as follows: 120 grams of anhydrous citric acid are dissolved in 200 grams of refined, dry pyridine containing 1.8 grams of concentrated sulfuric acid by mechanical agitation while heating on a steam plate at about 95° C. 20 grams of pure stearyl alcohol are then introduced. The stearyl alcohol is quite insoluble in the reaction mixture, a condition favoring monoester formation since a small concentration of stearyl alcohol in solution is reacted with a large excess of citric acid. The reaction mixture becomes homogeneous after about 4 hours, after which time the reaction mixture is maintained at 40°–50° C. for 16 hours.

The reaction mixture is poured into iced water containing 75 grams of concentrated sulfuric acid. The aqueous mixture is extracted with ethyl ether, and the ether extract is thoroughly washed with dilute hydrochloric acid and then with water and finally dried with anhydrous sodium sulfate. The ethyl ether solution of monostearyl citrate is evaporated, and the residue is crystallized several times from a petroleum ether, the boiling range of which is 80° to 112° C.

A typical melting point of the product is from 74° to 88.5° C., probably depending upon the proportion of symmetrical and unsymmetrical monoesters present. Other typical characteristics are:

|  | Found | Calc'd |
|---|---|---|
| Acid Value | 246 | 253 |
| Saponification Value | 358 | 379 |

Example 3.—Cream cheese containing monostearyl citrate, distearyl citrate and tristearyl citrate A mixture of monostearyl citrate, distearyl citrate and tristearyl citrate is added to a quantity of cream cheese during the working and salting stage in the conventional process for the production of cream cheese. The mixture of esters may be added in the form of a water paste similar to that described in Example 2 or dispersed in a small amount of cream. In either case, the water paste or cream is added to the body of cream cheese. A sufficient quantity of the mixture of monostearyl citrate, distearyl citrate and tristearyl citrate is incorporated in the cheese to obtain a concentration of 0.5% by weight of the mixture in the finished cream cheese.

The mixture of monostearyl citrate, distearyl citrate and tristearyl citrate is prepared as follows:

12.1 kilograms of citric acid monohydrate are added to 30 kilograms of commercial stearyl alcohol which is previously melted. During the addition, the mixture is agitated. The mixture is held at 150° C. under reduced pressure for a period of 1½ hours. At the end of this period, boiling and foaming cease substantially. The resulting product which consists of a mixture of monostearyl citrate, distearyl citrate and tristearyl citrate has an acid value of about 83, a saponification value of about 249.0 and a melting point of about 51–68° C. and a color on the Lovibond scale of about 36Y–5.8R. (5¼ inch column.)

Example 4.—Cottage cheese containing monostearyl citrate, distearyl citrate and tristearyl citrate A mixture of monostearyl citrate, distearyl citrate and tristearyl citrate prepared as described in Example 3 is incorporated in cottage cheese by any suitable mixer to effect the substantially uniform dispersion of the mixture of citric acid esters throughout the body of the cheese. A sufficient quantity of the mixture of citric acid esters is added to effect a concentration of 1% by weight of the mixture of esters in the cheese.

Example 5.—Neufchâtel cheese containing monoisopropyl citrate and diisopropyl citrate Monoisopropyl citrate and diisopropyl citrate are incorporated in Neufchâtel cheese in the same manner as described in Example 1 for cream cheese to effect a concentration of about .04% by weight of the mixture of monoisopropyl citrate and diisopropyl citrate in the Neufchâtel cheese. The mixture of monoisopropyl citrate and diisopropyl citrate is prepared in the same manner as that described in Example 1, and the mixture contains about 90% monoisopropyl citrate, about 10% diisopropyl citrate and a minor quantity of triisopropyl citrate.

Example 6.—Neufchâtel cheese containing monostearyl citrate, distearyl citrate and tristearyl citrate A mixture of monostearyl citrate, distearyl citrate, and tristearyl citrate is incorporated in Neufchâtel cheese at the time of draining and before working as described in Example 2. The amount of the mixture incorporated is sufficient to result in a concentration of .5% by weight of the mixture in the final Neufchâtel cheese.

Example 7.—Cheddar cheese containing monooctyl citrate, dioctyl citrate and trioctyl citrate A mixture of monooctyl citrate, dioctyl citrate and trioctyl citrate is incorporated in Cheddar cheese to effect a concentration of 0.1% by weight of the mixture in the final Cheddar cheese. This mixture may be incorporated in the cheese just prior to the heating and cooking operation and after the cutting operation in the conventional method of producing Cheddar cheese.

The mixture of monooctyl citrate, dioctyl citrate and trioctyl citrate is prepared as follows:

150 lbs. of octyl alcohol (commercial 2-ethyl hexanol) are heated in a closed vessel with 137 lbs. of anhydrous citric acid for 6½ hours at 150–155° C. The reaction product comprises three layers, an upper ester layer, a middle aqueous layer and an almost crystalline slurry. The upper oily layer which comprises mono-, di- and tri-octyl citrates is separated and deodorized for about 1½ hours under reduced pressure at 150° C. The odorless and light-colored and limpid product is found to have an acid value of 147.6 and a saponification value of 435 compared with theoretical values for dioctyl citrate of 135 and 405 respectively. The mixture contained about 20% monooctyl citrate, about 50% dioctyl citrate and the remainder trioctyl citrate.

Example 8.—Cheddar cheese containing monooleyl citrate, dioleyl citrate, monostearyl citrate and distearyl citrate A mixture of monooleyl citrate, monostearyl citrate and their corresponding di- and tri-esters is incorporated in Cheddar cheese during the milling operation. A sufficient quantity of the mixture of citric acid esters is added to effect a concentration of .25% by weight of the mixed esters in the final Cheddar cheese. The mixture is added during the milling operation in the production of Cheddar cheese by conventional methods.

The mixture of monooleyl citrate, monostearyl citrate and their corresponding di- and tri-esters together with some mixed esters of oleyl acohol and stearyl alcohol is prepared as follows:

A mixture of 14 kilograms of commercial oleyl alcohol and 14 kilograms of commercial stearyl alcohol is melted and to this mixture are added 10.2 kilograms of anhydrous citric acid. During the addition the mixture is agitated. The mixture is heated and held for a period of 1¼ hours at 150° C. under reduced pressure. At the end of this period, boiling and foaming cease substantially. The mixture contains monostearyl citrate, monooleyl citrate and their corresponding di- and tri-esters together with the mixed citric acid esters of oleyl and stearyl alcohols.

Example 9.—Swiss cheese containing monooleyl citrate and dioleyl citrate

A mixture of monooleyl citrate, dioleyl citrate and trioleyl citrate is incorporated in Swiss cheese by adding the mixture of citric acid esters during the salting operation in the conventional process for the production of Swiss cheese. A quantity of the mixture of citric acid esters is added to effect a concentration of .15% by weight of the mixture in the finished cheese.

The mixture of monoeleyl citrate, dioleyl citrate and trioleyl citrate is prepared as follows:

To 28 kilos of commercial oleyl alcohol are added 10.2 kilos of anhydrous citric acid. During the addition, the mixture is agitated. The mixture is heated and held for a period of about 1¼ hours at 150° C. under reduced pressure. At the end of this period, boiling and foaming ceases substantially. The mixture contains monooleyl citrate, dioleyl citrate and a small quantity of trioleyl citrate.

Example 10.—Cottage cheese containing monoisopropyl citrate and diisopropyl citrate Monoisopropyl citrate may be incorporated in a cheese such as cottage cheese together with a quantity of monoglycerides of a fatty acid, such as monoglycerides of fatty acids, of hydrogenated shortening type oils. For example, sufficient such monoglycerides and a mixture of monoisopropyl citrate and diisopropyl citrate prepared as described in Example 1 may be added to cottage cheese to effect a concentration of 0.9% monoglycerides and .025% of the mixture of monoisopropyl citrate and diisopropyl citrate by weight in the final cottage cheese. For this purpose, the mixture of monoisopropyl citrate and diisopropyl citrate is dissolved in such monoglycerides and the resulting solution added to the cheese.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A cheese product comprising butter fat, water, water soluble non-fat milk solids, milk protein and a member of the class consisting of monoalkyl esters of citric acid, monoalkylene esters of citric acid, dialkyl esters of citric acid and dialkylene esters of citric acid.

2. A cheese product comprising butter fat, water, water soluble non-fat milk solids, milk protein and .002 to .1% by weight of a monoalkyl ester of citric acid.

3. A cheese product comprising butter fat, water, water soluble non-fat milk solids, milk protein and .02 to .05% of a monoalkyl ester of citric acid.

4. A cheese product comprising butter fat, water, water soluble non-fat milk solids, milk protein and .002 to .1% by weight of a monoalkylene ester of citric acid.

5. A cheese product comprising butter fat, water, water soluble non-fat milk solids, milk protein and .02 to .05% of a monoalkylene ester of citric acid.

6. A cheese product comprising butter fat, water, water soluble non-fat milk solids, milk protein and .01 to 1% of a dialkyl ester of citric acid.

7. A cheese product comprising butter fat, water, water soluble non-fat milk solids, milk protein and a mixture of .002 to .1% of a monoalkyl ester of citric acid and .01 to 1% of a dialkyl ester of citric acid.

8. A cheese product comprising butter fat, water, water soluble non-fat milk solids, milk protein and a mixture of .02 to .05% of a monoalkyl ester of citric acid and .01 to .1% of a dialkyl ester of citric acid.

9. A cheese product comprising butter fat, water, soluble non-fat milk solids, milk protein and a mixture of .002 to .1% of a monoalkylene ester of citric acid and .01 to 1% of a dialkylene ester of citric acid.

10. A cheese product comprising butter fat, water, water soluble non-fat milk solids, milk protein and a mixture of .02 to .05% of a monoalkylene ester of citric acid and .01 to 1% of a dialkylene ester of citric acid.

11. A cheese product comprising butter fat, water, water soluble non-fat milk solids, milk protein and a mixture of a monoalkyl ester of citric acid, a dialkyl ester of citric acid and a solubilizing agent.

12. A cheese product comprising butter fat, water, water soluble non-fat milk solids, milk protein and a mixture of a monoalkyl ester of citric acid, a dialkyl ester of citric acid and a trialkyl ester of citric acid.

13. A cheese product comprising butter fat, water, water soluble non-fat milk solids, milk protein and a mixture of a monoalkylene ester of citric acid, a dialkylene ester of citric acid and a trialkylene ester of citric acid.

14. A method of producing an improved cheese product comprising butter fat, water, water soluble non-fat milk solids and milk protein, said method comprising incorporating in said cheese product a member selected from the class consisting of monoalkyl esters of citric acid, monoalkylene esters of citric acid, dialkyl esters of citric acid and dialkylene esters of citric acid.

15. A method of producing an improved cheese product comprising butter fat, water, water soluble non-fat milk solids and milk protein, said method comprising incorporating in said cheese product .002 to .1% of a monoalkyl ester of citric acid.

16. A method of producing an improved cheese product comprising butter fat, water, water soluble non-fat milk solids and milk protein, said method comprising incorporating in said cheese product .002 to .1% of a monoalkylene ester of citric acid.

17. A method of producing an improved cheese product comprising butter fat, water, water soluble non-fat milk solids and milk protein, said method comprising incorporating in said cheese product .002 to .1% by weight of a monoalkyl ester of citric acid and .01 to 1% of a dialkyl ester of citric acid.

18. A method of producing an improved cheese product comprising butter fat, water, water soluble non-fat milk solids and milk protein, said method comprising incorporating in said cheese product .002 to .1% by weight of a monoalkylene ester of citric acid and .01 to 1% of a dialkylene ester of citric acid.

19. A method of producing an improved cheese product comprising butter fat, water, water soluble non-fat milk solids and milk protein, said method comprising incorporating in said cheese product .02 to .05% of a monoalkyl ester of citric acid and .01 to 1% of a dialkyl ester of citric acid.

20. A method of producing an improved cheese product comprising butter fat, water, water soluble non-fat milk solids and milk protein, said method comprising incorporating in said cheese product .02 to .05% of a monoalkylene ester of citric acid and .01 to 1% of a dialkylene ester of citric acid.

CHESTER M. GOODING.
RALPH H. NEAL.
HANS W. VAHLTEICH.

REFERENCES CITED

The following references are of record in the file of this patent:

UNITED STATES PATENTS

| Number | Name | Date |
|---|---|---|
| 1,993,738 | Graves et al. | Mar. 12, 1935 |
| 2,015,088 | Reid | Sept. 24, 1935 |
| 2,025,984 | Harris | Dec. 31, 1935 |
| 2,305,622 | Kremers | Dec. 22, 1942 |

OTHER REFERENCES

"The Chemical Senses," by R. W. Moncrief, published 1944 by Leonard Hill Lmtd., London, pages 187, 188.